United States Patent [19]
Kumakura

[11] Patent Number: 5,834,752
[45] Date of Patent: Nov. 10, 1998

[54] ROTARY TOUCH SCANNER

[75] Inventor: Koji Kumakura, Chigasaki, Japan

[73] Assignee: Zebrac Company, Japan

[21] Appl. No.: 918,986

[22] Filed: Aug. 27, 1997

Related U.S. Application Data

[63] Continuation of Ser. No. 507,994, Jul. 27, 1995, abandoned.

[30] Foreign Application Priority Data

Jul. 27, 1994 [JP] Japan ..................................... 6-175602

[51] Int. Cl.$^6$ ...................................................... G06K 7/10
[52] U.S. Cl. ........................... 235/462; 235/454; 235/467
[58] Field of Search .................... 235/454, 462, 235/464, 467, 470

[56] References Cited

U.S. PATENT DOCUMENTS

| | | | |
|---|---|---|---|
| 3,689,744 | 9/1972 | Wildhaber | 235/467 |
| 4,692,603 | 9/1987 | Brass et al. | 235/467 X |
| 4,939,356 | 7/1990 | Rando et al. | 235/467 |
| 5,039,184 | 8/1991 | Murakawa et al. | 235/467 |
| 5,291,319 | 3/1994 | Harris | 235/457 |
| 5,559,320 | 9/1996 | Loya | 235/467 |
| 5,637,854 | 6/1997 | Thomas | 235/462 |
| 5,705,799 | 1/1998 | Li | 235/462 |

*Primary Examiner*—Donald T. Hajec
*Assistant Examiner*—Douglas X. Rodriquez
*Attorney, Agent, or Firm*—Brown, Martin, Haller & McClain, LLP

[57] ABSTRACT

A rotary touch scanner for reading a bar code pattern includes: an outer frame formed with an opening portion, a rotary ring rotatably housed in the outer frame, a plurality of convex lenses mounted on an outer periphery of the rotary ring at regular angular intervals, rotary ring rotating device associated with the rotary ring, and a light receiving element disposed at a center of the rotary ring and having a light receiving surface directed to the opening portion of the outer frame; light scattered from a bar code label disposed in front of the opening portion of the outer frame being condensed and further focused onto the light receiving surface of the light receiving element as a real image through one of the convex lenses rotated by the rotary ring rotating device, continuously.

9 Claims, 4 Drawing Sheets

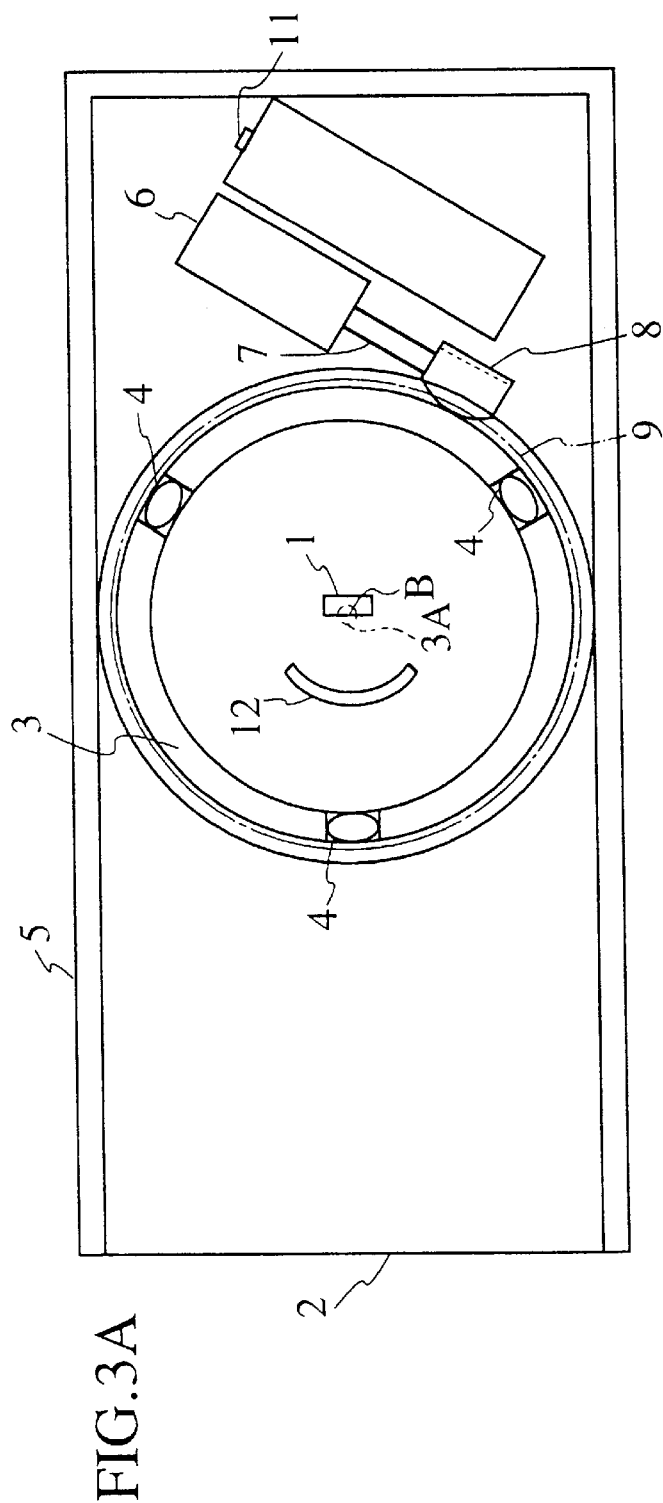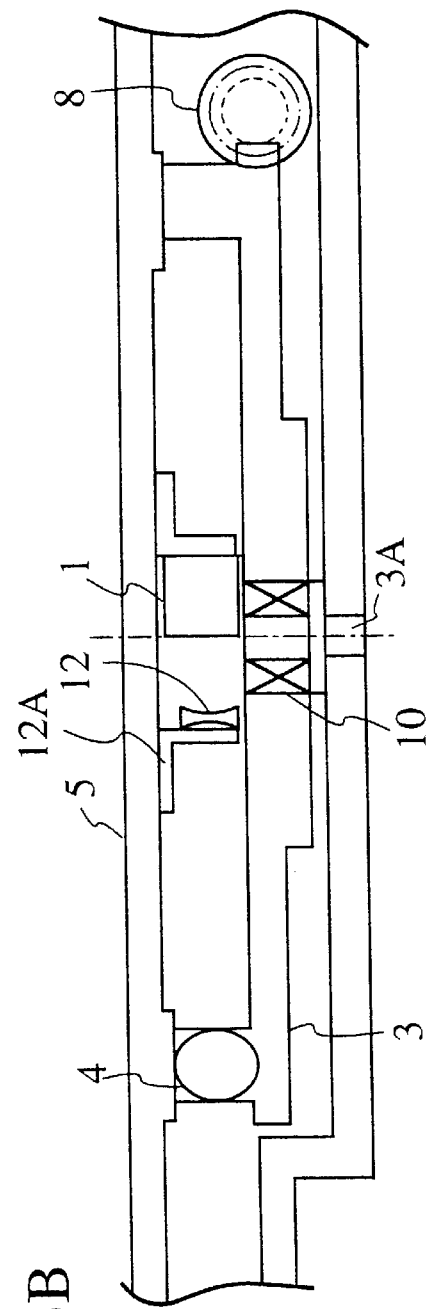
FIG.3A
FIG.3B

ROTARY TOUCH SCANNER

This is a continuation of application Ser. No. 08/507,994, filed Jul. 27, 1995 now abandoned.

BACKGROUND OF THE INVENTION

1. Field of the Invention

The present invention relates to a rotary touch scanner, and more specifically to a rotary touch scanner suitable for use as a bar code pattern reader.

2. Description of the Prior Art

FIG. 1 shows an example of a prior art touch scanner. In FIG. 1, the touch scanner is composed of an image sensor (e.g., CCD (charge coupled device)) 21, a convex lens 22, a red light emitting device 23, etc. Further, the reference numeral 24 denotes a bar code label. In FIG. 1, the bar code label 24 is irradiated with red light emitted by the red light emitting device 23. The light reflected from the bar code label 24 is condensed and further focused through the convex lens 22 onto the front surface of the image sensor 21 as a real image thereof. On the other hand, the CCD image sensor 21 is driven to scan the real image of the bar code label pattern focused thereon, to read the bar code pattern.

In the prior art touch scanner as described above, since the bar code label pattern can be read momentarily, as far as the touch scanner is brought into soft contact with the bar code label, the usability thereof is excellent, as compared with a pen scanner by which a bar code label pattern is scanned manually so as to cross the bars.

In the above-mentioned prior art touch scanner, however, there exist such problems in that the light irradiated upon the label is limited to only red light (monochromatic light); the resolution (resolving power) is not sufficient and further difficult to increase it, in spite of the fact that the label has been recently printed by a high density printer; the costs of the parts assembled in the scanner are relatively high, etc.

In more detail, first since the red light is used as the irradiation light, it is impossible to read the bar code label patterns printed by red-based colors. In addition, the bar code label pattern can be read only under some illumination conditions such that the touch scanner can be used only below the illumination intensity of 3000 lux (by fluorescent light). Further, it is of course impossible to read bar code patterns on a picture displayed on a Braun tube (cathode-ray tube) or a liquid crystal display.

Secondly, the resolution is not high due to the aberration of the convex lens, the non-uniformity of the sensing characteristics of the CCD elements, etc., even if the illumination light is uniform. In the case of the prior art touch scanner, since the monochromatic light is used, although the chromatic aberration can be eliminated, the spherical aberration will not be eliminated. Further, although the resolution can be increased when the size of the CCD elements is reduced, it is difficult to keep an excellent uniformity of the sensing characteristics of the CCD elements. Further, when the lens aperture is reduced, although the resolution can be somewhat improved, the illumination light of more uniform and higher intensity is required to that extent.

Thirdly, the reason why the parts cost is high in the prior art touch scanner is that: an optical system for reading two-dimensional image is provided, in spite of the fact that only one-dimensional bar code pattern image is required to read. In addition, a scanning system composed of the CCD image sensor of high resolution and an electronic circuit for driving and controlling the CCD image sensor is necessary.

SUMMARY OF THE INVENTION

With these problems in mind, therefore, it is the object of the present invention to provide a touch scanner usable under white light, high in resolution, deep in depth of field, less in chromatic and spherical aberrations, low in parts and manufacturing cost, easy to handle, etc.

To achieve the above-mentioned object, the present invention provides a rotary touch scanner for reading a bar code pattern, comprising: an outer frame 5 formed with an opening portion 2; a rotary ring 3 rotatably housed in said outer frame; a plurality of convex lenses 4 mounted on an outer periphery of said rotary ring at regular angular intervals; rotary ring rotating means 6, 7, 8 associated with said rotary ring; and a light receiving element 1 disposed at a center of said rotary ring and having a light receiving surface directed to the opening portion of said outer frame, light scattered from a bar code label disposed in front of the opening portion of said outer frame being condensed and further focused onto the light receiving surface of said light receiving element as a real image through one of said convex lenses rotated by said rotary ring rotating means, continuously.

Further, it is preferable that the rotary touch scanner further comprises a correction lens 12 fixed to said outer frame and disposed in front of said light receiving surface of said light receiving element 1 for correction of difference in distance between the bar code label and said light receiving element caused by change in read angle $\theta$ of said light receiving element.

Further, it is preferable that a plurality of sets of said light receiving elements and said convex lenses are stacked at multistage in an axial direction of said rotary ring, to read a multistage bar code label patterns, simultaneously.

Here, it is preferable that said rotary ring rotating means comprises: a motor 6 having a motor shaft 7; a worm 8 attached to and end of the motor shaft; and a worm gear 9 formed on the outermost periphery of said rotary ring in mesh with said worm.

In the rotary touch scanner according to the present invention, since a novel scanning method such that the convex lenses mounted on the rotary ring are rotated to scan bar code label pattern continuously, it is possible to use only the paraxial rays incident upon near the optical axis of the lenses, so that it is possible to realize a touch scanner less in chromatic and spherical aberrations, high in resolution, and low in cost.

In more detail, when the convex lenses mounted on the rotary ring are rotated, light scattered from an intersection (A1 or A2 point) between an extension line of the optical axis of the convex lens and the bar code label is condensed and further focused onto the same surface (B point) of the light receiving element (located at the central point of the rotary ring) continuously through the convex lenses to obtain continuous real label pattern images. Here, the essential point of the scanning method according to the present invention is that the center of the light receiving element (B point) and the bar code label (A1 or A2 point) are both always kept on the optical axis of one of the convex lenses at all the time when the rotary ring is being rotated to sense the bar code label pattern.

In the above-mentioned optical system, since a real image can be focused onto the light receiving element on the basis of only the paraxial rays, it is possible to obtain a real image of high resolution, while minimizing the influence of the chromatic and spherical aberrations upon the image to be sensed.

Further, since the correction lens fixed to the outer frame is disposed in front of the light receiving surface of the light receiving element, it is possible to further correct the difference in distance between the sensed bar code label and the light receiving element caused by the change of the read angle or the elevation angle θ of the light receiving element.

Further, when one set of the light receiving element and the convex lenses are stacked at multistage in the axial direction of the rotary ring, it is possible to read the multistage bar code label patterns at the same time by a single touch scanning operation.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which:

FIG. 3A is a longitudinal cross-sectional view showing a second embodiment of the rotary touch scanner according to the present invention;

FIG. 3B is an enlarged cross-sectional view showing the convex lens driving portion of the second embodiment shown in FIG. 3A.

DETAILED DESCRIPTION OF THE PREFERRED EMBODIMENTS

Embodiments of the present invention will be described in detail hereinbelow with reference to the attached drawings.

Figure 1:
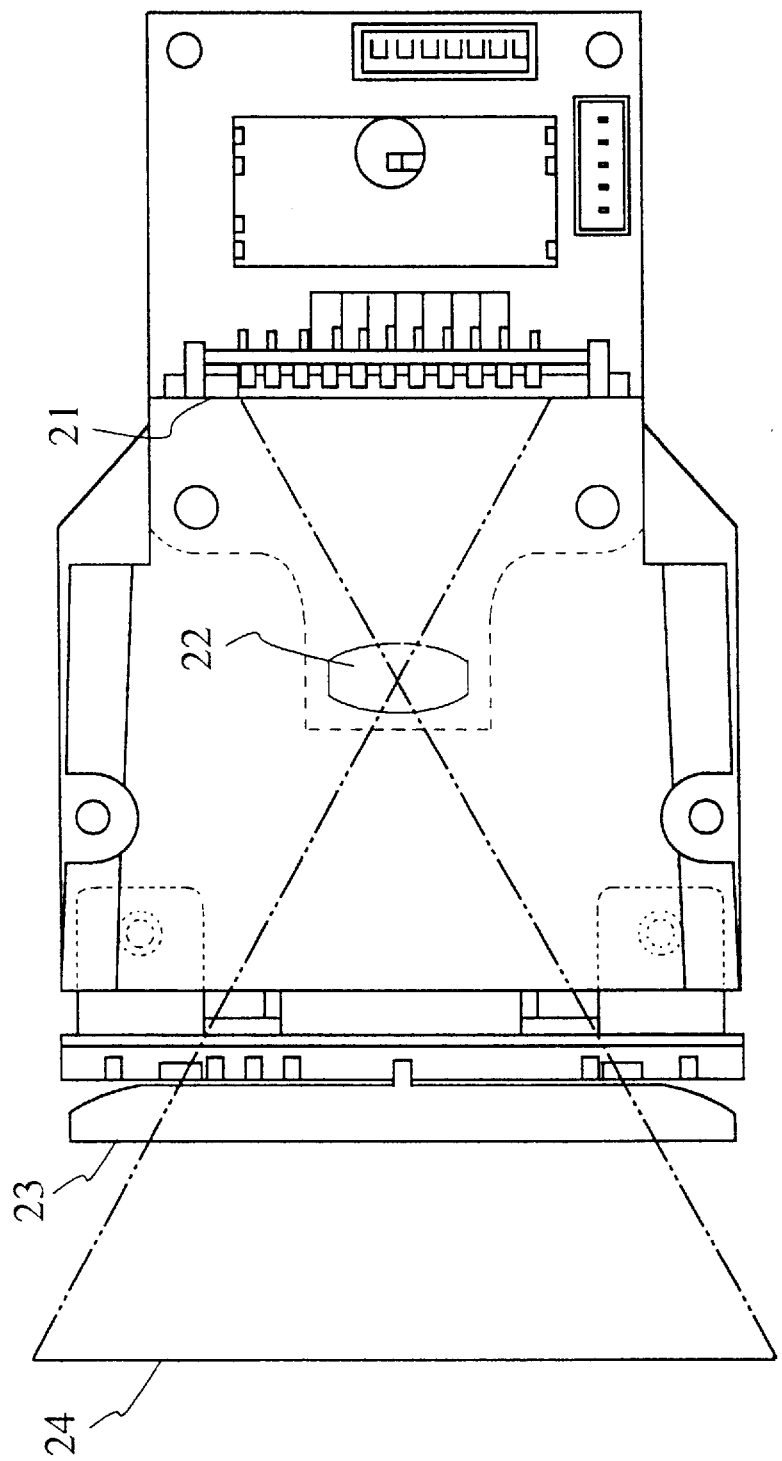
FIG. 1 is a cross-sectional view showing an example of the prior art touch scanner.
Figure 2A:
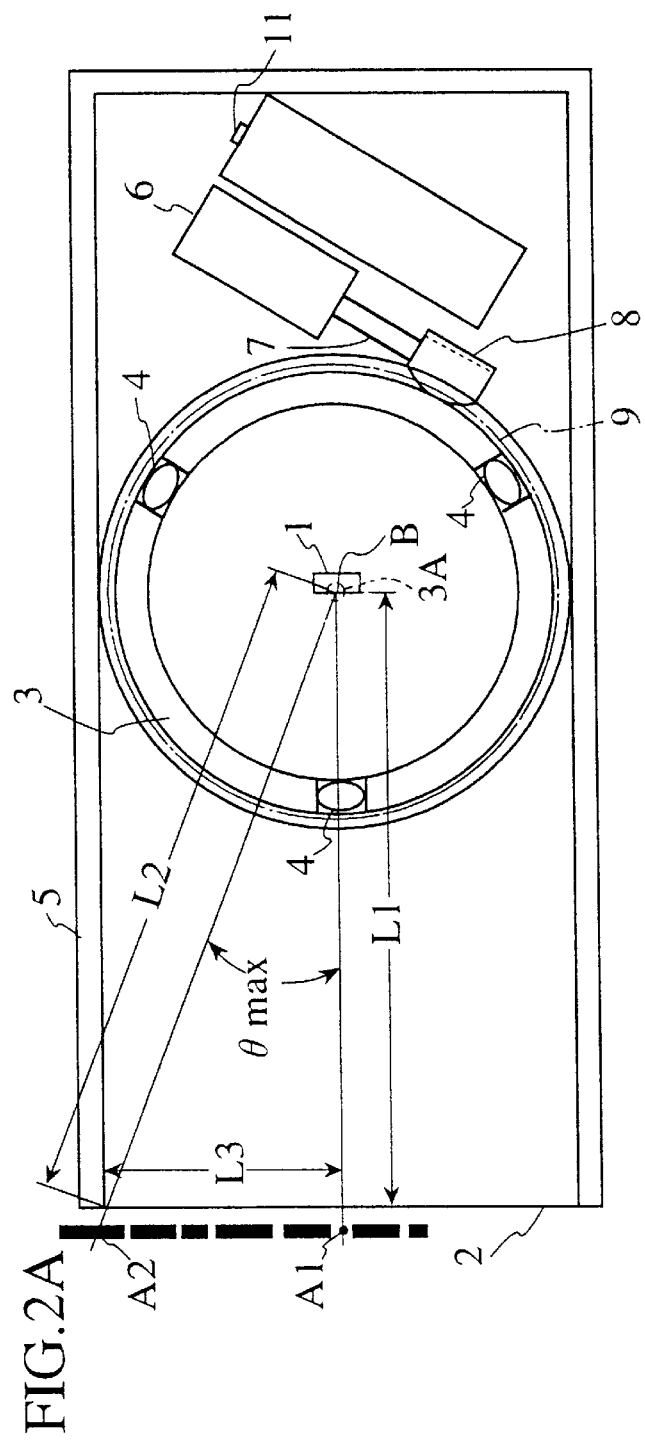
FIG. 2A is a longitudinal cross-sectional view showing a first embodiment of the rotary touch scanner according to the present invention.
Figure 2B:
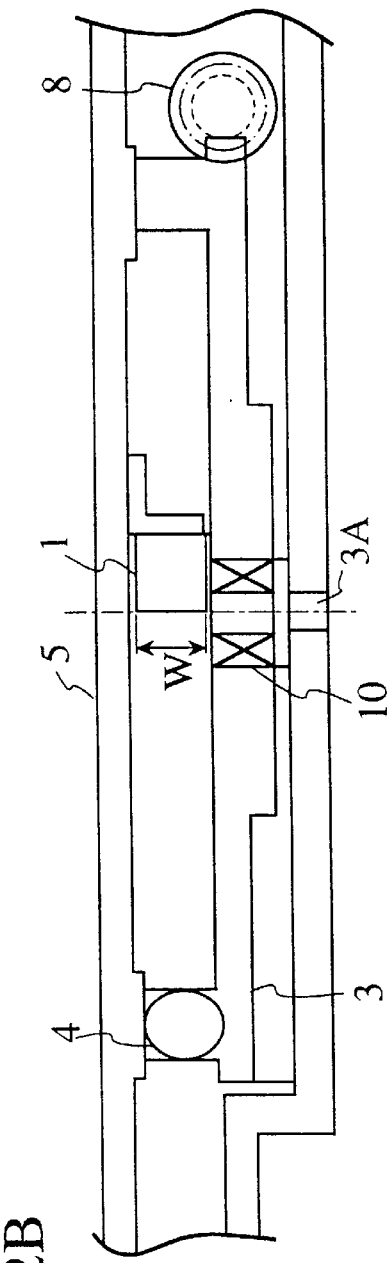
FIG. 2B is an enlarged cross-sectional view showing the convex lens driving portion of the first embodiment shown in FIG. 2A.

FIGS. 2A and 2B show a first embodiment thereof. The rotary touch scanner comprises an outer frame or enclosure 5; a rotary members or ring 3; a light receiving element 1; a plurality of convex lenses 4; lens rotating means composed of a motor 6, a motor shaft 7, a worm 8 and a worm gear 9, and a battery 11.

The rotary member or ring 3 is rotatable about a rotation axis or axle 3A which extends through a first point B on enclosure or frame 5. Each of the convex lenses 4 has a center defining a second point fixed to the rotary member or ring 3. Both the first point and the second point reside on an imaginary plane extending perpendicular to the rotation axis 3A, as best illustrated in FIG. 2A. The enclosure or frame 5 has an opening 2 which has a periphery which crosses the imaginary plane at a pair of additional points which cooperate with the first point B to define an angular sight zone $\theta_{MAX}$. The angular sight zone covers an ordered total of bar codes between points A1 and A2 in an array of bar codes when an object carrying the array of bar codes is brought substantially into contact with the opening in the enclosure, as illustrated schematically at the left-hand side of FIG. 2A.

The light scattered from a bar code label is introduced through the opening portion 2 of the outer frame 5 and then condensed through any one of the convex lenses 4 arranged on the outer peripheral of the rotary ring 3 at regular angular intervals. Therefore, a real image of a bar code label pattern can be focused onto the light receiving surface of the light receiving element 1 arranged at the center of the rotary ring 3. Here, the focal distance of each of the convex lenses 4 is of course so designed that a real bar code pattern image can be just focused to a center of the rotary ring 3.

In use, when the motor 6 is started by power of the battery 11, for instance, since power is transmitted from the motor 6 to the rotary ring 3 by way of the motor shaft 7, the worm 8 fixed to an end of the motor shaft 7, and a worm gear 9 formed on the outer circumference of the rotary ring 3, the rotary ring 3 is rotated about its center axle 3A disposed at the lower portion of the rotary ring 3 supported by a needle bearing 10 (as shown in FIG. 2B). Accordingly, the three convex lenses 4 can scan the surface of the bar code label pattern continuously, so that a real image of the bar code pattern can be focused on the light receiving element 1 continuously.

Here, in this embodiment, when the light receiving surface of the light receiving element 1 is rectangular in shape (the lateral width W (shown in FIG. 2B) is 0.05 mm) and when the magnification of the real image to a subject (bar code patterns) to be sensed is 0.5, the resolution (resolving power) is 0.1 mm. In this connection, the resolution of the prior art high-resolution scanner is 0.15 mm or more.

As described above; in the light receiving element 1 of the present invention, since the lateral width W (=0.05 mm) of the light receiving surface is very narrow, the received light is limited to only the paraxial rays, so that it is possible to obtain a real image of extremely small chromatic and spherical aberrations. In addition, since only the paraxial rays are sensed, the aperture diameter of the convex lenses 4 can be reduced sufficiently, so that it is possible to increase the depth of field. In FIG. 2A, when the focal distance f of the convex lens 4 is determined 20 mm and the aperture diameter A of the convex lens 4 is determined 2 mm, the F-value (f/A=20/2) is about 10, so that it is possible to obtain a sufficiently large depth of field. In this connection, in the case of the prior art scanner, the depth of field is ±5 mm from the bar code label read position when a label of 13 positions prescribed by JAN is read. Here, JAN implies Japanese Article Numbers indicative of commodity bar code numbers prescribed by Japanese Industrial Standard.

Further, the read elevation angle θ roughly changes within a range of $(30/90) \geq \tan\theta \geq -(30/90)$. Here, 30 mm indicates a half (L3) of the longitudinal length (2×L3) of the opening portion 2 of the outer frame 5 (in FIG. 2A), and 90 mm indicates a length (L1) between an end of the opening portion 2 of the outer frame 5 and the central position B of the light receiving element 1 (in FIG. 2A). Accordingly, the horizontal distance between the central position B of the light receiving element 1 and the bar code label A1 is about L1=90 mm (at the minimum) at θ=0 and the oblique distance between the two is about L2=95 mm (at the maximum) at θ=θmax, so that the difference between the minimum and maximum distances (L2–L1) is approximately (95–90=5 mm). Here, since the depth of field of ±5 mm is allowed relative the bar code label read position in the prior art scanner, as already explained above, and further since the depth of field can be further increased in the present invention, the above-mentioned difference of 5 mm can be considered to lie within the allowable range.

Further, in the example shown in FIG. 2A, three convex lenses 4 are arranged at 120° angular intervals. Therefore, whenever the rotary ring 3 rotates once, three bar code patterns can be read continuously. Without being limited only to three, when four lenses 4 are arranged at 90° angular intervals, it is possible to read four bar code patterns continuously for each revolution of the rotary ring 3.

Further, although it is preferable to attach an auxiliary lamp (illumination light) near the opening portion 2 of the outer frame 5, where the job or work site is sufficiently bright and thereby a sufficient light intensity can be obtained by only the ambient light, it is possible to read bar code patter by covering a part of the aperture 2 of the outer frame 5 with a transparent plastic cover (not shown) (without use of any auxiliary illumination light).

Further, the bar code pattern scanned and read by the light receiving element 1 is further transmitted to another processing unit to decode the sensed bar code pattern, that is, to detect various data represented by the bar code pattern.

FIGS. 3A and 3B show a second embodiment of the present invention. In the first embodiment shown in FIGS. 2A and 2B, there exists a difference of 5 (=95−90) mm between at the minimum elevation angle ($\theta=0$)) and at the maximum elevation angle ($\theta=\theta$ max) of the rotating convex lenses 4 in distance between the light receiving element 1 and the bar code label to be read. In this second embodiment, a correction lens 12 is disposed in front of the light receiving surface of the light receiving element 1 so that the above-mentioned difference in distance can be corrected. In more detail, the correction lens 12 is fixed to the outer frame 5 by use of an appropriate bracket 12A. Therefore, in this embodiment, it is possible to always focus a real image of the bar code label pattern onto the light receiving element 1 more accurately, irrespective of the variation of the read angle (elevation angle) $\theta$ of the rotating convex lenses 4.

Figure 4:
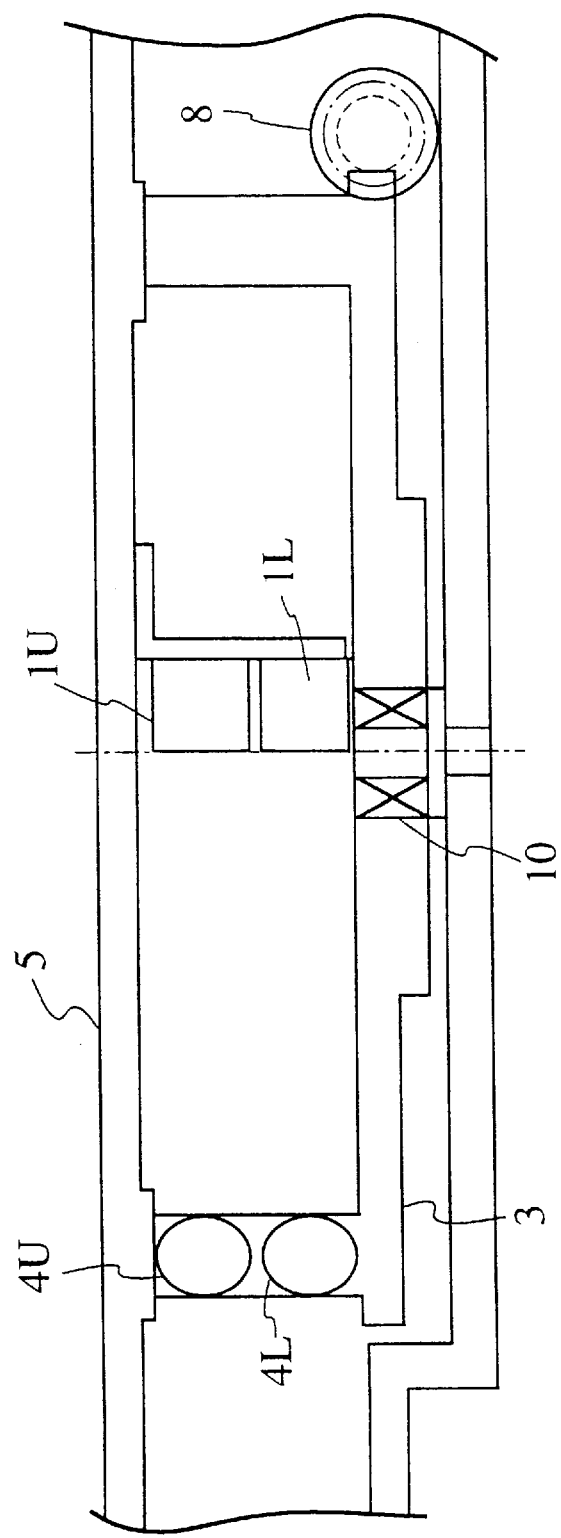
FIG. 4 is an enlarged cross-sectional view showing the convex lens driving portion of the third embodiment of the rotary touch scanner according to the present invention.

FIG. 4 shows a third embodiment of the present invention. In this embodiment, two sets of the light receiving elements 1 and two sets of a plurality of convex lenses 4 are stacked along the axial direction of the rotary ring 3, so that two-stage JANs (bar code labels used for apparel commodities) can be read by only a single touch. That is, the upper stage bar code pattern can be read by the upper lens 4U and the upper light receiving element 1U, and the lower stage bar code pattern can be read by the lower lens 4L and the lower light receiving element 1L, respectively at the same time by only a single touch with the bar code label of the two-stage JANS.

In the above-mentioned rotary touch scanner according to the present invention, since a novel scanning method is adopted such that a plurality of convex lenses mounted on the rotary ring are rotated, it is possible to obtain a real image on the light receiving element on the basis of only the paraxial rays, thus providing various following features:

(1) Reading under white light

Since only the paraxial rays are used for reading the bar code label pattern, the reduction of resolution due to chromatic aberration can be minimized. Therefore, it is unnecessary to use monochromatic (red) light, so that any bar code patterns printed by red-based colors can be read. Of course, the bar code patterns can be read under the natural light and white light. In addition, bar code patterns displayed on a Braun tube (CRT) or a LCD (liquid crystal display) can be also scanned or read.

(2) High resolution

Since only the paraxial rays are used to read bar code patterns, the resolution is not reduced due to spherical aberration. This is because when the rotary ring 3 is being rotated, an intersection point A1 or A2 (shown in FIG. 2A) (between an extension line of the optical axis of the convex lens 4 and the bar code label) and the light receiving element point B (shown in FIG. 2A) are both always located on the same optical axis of the convex lens 4. In the prior art scanner, since the peripheral rays incident upon and passed through the outer circumference of the lens are detected, the resolution has been reduced due to the spherical aberration.

In lens-rotation scanning method of the present invention, however, the resolution can be increased by simply reducing the aperture width of the light receiving element 1. On the other hand, in the case of the prior art scanner, since the size of the CCD sensor must be reduced in order to increase the resolution, there exists a limit of reduction of the size of the CCD sensor and further a higher technology is required.

(3) Low cost

Since a simple convex lens or a plastic lens can be used, the cost of the lenses is extremely low. In addition, since the aberration cannot be taken into account, it is not necessary to use an expensive lens so designed as to remove various aberrations.

Further, since a pin-point type light receiving element can be used, without use of any high costly CCD sensor and an electronic circuit for driving and controlling the CCD sensor, the cost of the light receiving element can be reduced extremely.

Further, since the structures of the optical system and the electronic circuit system can be both simplified, the power consumption can be saved markedly. Although the rotary rings 3 must be rotated by the motor 6, it is possible to use a motor of low cost and low power consumption, with the result that a small battery can be used as the power of the rotary touch scanner according to the present invention.

As described above, in the rotary touch scanner according to the present invention, since the lenses mounted on a rotary ring are rotated to scan the bar code label pattern, it is possible to provide a touch scanner simple in structure, high in resolution, deep in depth of field, usable under white light, and low in manufacturing cost. The bar code labels have now being widely used in various physical distribution fields such a POS (point of sales) or FA (factorial automation), and further even in the field of OA (official automation). Therefore, the bar code readers of touch scanner type will be widely used in various fields in the future in various countries. Recently, some bar codes representative of Chinese characters have been developed, in addition to the bar codes representative of numerical values. As a result, bar code labels will be used more widely all over the world. Therefore, the touch scanner usable under white light, high in resolution, and low in cost will be required more and more.

Although some preferred embodiments of the invention have been described above by way of example only, it will be understood by those skilled in the field that modifications may be made to the disclosed embodiments without departing from the scope of the invention, which is defined by the appended claims.

I claim:

1. A rotary touch scanner for reading a bar code pattern composed of an array of parallel bar codes having arbitrary lengths of which a respective one represents a single code and of which an ordered total carries decodable information, the rotary touch scanner comprising:

an enclosure having a first point;

a rotary member rotatably mounted in said enclosure for rotation about a rotation axis extending through said first point, the rotary member having a second point fixed to the rotary member, both the first point and the second point residing on an imaginary plane extending perpendicular to the rotation axis;

the enclosure having an opening having a periphery crossing the imaginary plane at a pair of additional points cooperating with the first point to define an angular sight zone covering an ordered total of bar codes in an array of bar codes when an object carrying the array of bar codes is brought substantially into contact with the enclosure;

a light receiving element positioned at said first point;

a convex lens arranged at said second point on said rotary member for focusing light rays incident to said opening on said light receiving element when the second point lies in the angular sight zone;

a drive means for driving the rotary member whereby the second point traverses the angular sight zone repeatedly so that an image of said ordered total of bar codes is continuously scanned by the light receiving element; and the light receiving element having a light sensing region thereof of predetermined size for receiving first light rays of the focused light rays substantially paraxial with respect to the convex lens, and for excluding second light rays of the focused light rays surrounding said first light rays, whereby only light rays paraxial with respect to said lens are received by said light receiving element.

2. The rotary touch scanner as claimed in claim 1, further comprising an additional convex lens located at a third point on said rotary member spaced from said second point, said third point being positioned to traverse the angular sight zone as said rotary member is rotated, for focusing light rays incident to said opening on said light receiving element.

3. The rotary touch scanner as claimed in claim 2, wherein said third point is located at an angular spacing from said second point which is larger than a sight angle of said angular sight zone.

4. The rotary touch scanner as claimed in claim 3, wherein the drive means comprises means for driving said rotary member so that said second and third points revolve about said rotation axis at substantially constant angular speed.

5. The scanner as claimed in claim 1 wherein said light sensing region is rectangular and has a width of 0.05 mm.

6. A rotary touch scanner for reading a bar code pattern composed of an array of parallel bar codes having arbitrary lengths of which a respective one represents a single code and of which an ordered total carries decodable information, said rotary touch scanner comprising:

an enclosure formed with an opening defining an angular sight zone ($2\times\theta_{MAX}$) about a scan point in the enclosure, the opening having a width for scanning an ordered total of parallel bar codes brought close thereto;

a rotary member rotatable about the scan point;

a convex lens arranged on the rotary member so that an optical axis of the lens turns about the scan point, traversing a sight zone, as the rotary member is rotated; and an image sensing element placed in a vicinity of the scan point and comprising sensing means for receiving substantially only light rays incident to the opening, focused by the convex lens and paraxial to the optical axis.

7. A rotary touch scanner according to claim 6, further comprising drive means for driving the rotary member to rotate.

8. A rotary touch scanner according to claim 7, wherein the drive means is accommodated in the enclosure.

9. A rotary touch scanner according to claim 6, wherein the rotary member is enclosed by the enclosure.

* * * * *